United States Patent
Shrivastava et al.

(10) Patent No.: US 12,220,669 B2
(45) Date of Patent: Feb. 11, 2025

(54) FILTER SCREEN

(71) Applicant: ACCELERATED FILTRATION, INC., Midland, MI (US)

(72) Inventors: Abhishek Shrivastava, Edina, MN (US); Scott T. Burr, Midland, MI (US); Piyush Soni, Midland, MI (US); Laura J. Dietsche, Midland, MI (US); Santhosh K. Ramalingam, Singapore (SG)

(73) Assignee: Accelerated Filtration, Inc., Midland, MI (US)

( * ) Notice: Subject to any disclaimer, the term of this patent is extended or adjusted under 35 U.S.C. 154(b) by 711 days.

(21) Appl. No.: 17/260,044

(22) PCT Filed: Jul. 10, 2019

(86) PCT No.: PCT/US2019/041137
§ 371 (c)(1),
(2) Date: Jan. 13, 2021

(87) PCT Pub. No.: WO2020/023209
PCT Pub. Date: Jan. 30, 2020

(65) Prior Publication Data
US 2021/0268448 A1    Sep. 2, 2021

Related U.S. Application Data

(60) Provisional application No. 62/711,178, filed on Jul. 27, 2018.

(51) Int. Cl.
*B01D 69/02* (2006.01)
*B01D 61/14* (2006.01)
(Continued)

(52) U.S. Cl.
CPC ............. *B01D 69/02* (2013.01); *B01D 61/14* (2013.01); *C02F 1/444* (2013.01); *B01D 63/16* (2013.01);
(Continued)

(58) Field of Classification Search
None
See application file for complete search history.

(56) References Cited

U.S. PATENT DOCUMENTS

| | | |
|---|---|---|
| 149,553 A | 4/1874 | Weston |
| 5,085,771 A | 2/1992 | Huang |

(Continued)

FOREIGN PATENT DOCUMENTS

| | | |
|---|---|---|
| DE | 1167795 B | 4/1964 |
| DE | 3911444 A1 | 10/1990 |

(Continued)

OTHER PUBLICATIONS

Office Action issued in co-pending Application No. JP 2021-502800 mailed Dec. 5, 2023, with English translation (6 pages).
(Continued)

*Primary Examiner* — Robert J Popovics
(74) *Attorney, Agent, or Firm* — Young Basile Hanlon & MacFarlane, P.C.

(57) ABSTRACT

Provided is a filter screen having a plurality of slots, each slot having a longest principal axis A1 that has a length L, and each slot having a second axis A2 that is perpendicular to A1 and that has a length W,
wherein the distance between adjacent slots in the direction of the axes A2 is XP; wherein XP is greater than W;
wherein the distance between adjacent slots in the direction of the axes A1 is YP;
either wherein L is 800 micrometers or less and XP is 350 micrometers or less, or wherein L is 1600 μm or less and XP is 180 μm or less.
(Continued)

Also provided is a method of filtering feed water using such a filter screen.

8 Claims, 4 Drawing Sheets

(51) Int. Cl.
    *B01D 63/16*     (2006.01)
    *B01D 65/02*     (2006.01)
    *C02F 1/44*     (2023.01)

(52) U.S. Cl.
    CPC .......... *B01D 65/02* (2013.01); *B01D 2315/02* (2013.01); *B01D 2315/10* (2013.01); *B01D 2321/30* (2013.01); *B01D 2325/021* (2013.01)

(56) References Cited

U.S. PATENT DOCUMENTS

| | | | |
|---|---|---|---|
| 6,468,426 B1 | 10/2002 | Klass | |
| 8,663,472 B1 | 3/2014 | Mallard et al. | |
| 2003/0024873 A1 | 2/2003 | Klass | |
| 2014/0042083 A1* | 2/2014 | Mallard | B01D 29/908 |
| | | | 210/512.1 |
| 2017/0173501 A1 | 6/2017 | Li | |
| 2021/0268448 A1* | 9/2021 | Shrivastava | C02F 1/001 |

FOREIGN PATENT DOCUMENTS

| | | | |
|---|---|---|---|
| GB | 1489838 A | 10/1977 | |
| JP | 2015520672 A | 7/2015 | |
| JP | 2017502841 A | 1/2017 | |
| WO | 2004064978 A1 | 8/2004 | |
| WO | WO-2014001419 A1 * | 1/2014 | ............ A23C 19/05 |

OTHER PUBLICATIONS

Office Action issued in co-pending Application No. JP 2021-502800 mailed Jun. 6, 2023, with English translation (6 pages).
Written Opinion issued in co-pending Brazilian Application No. BR112021000922 dated Feb. 1, 2023 (with partial English translation).
International Search Report and Written Opinion in co-pending Application No. PCT/US2019/041137 mailed Dec. 16, 2019 (14 pages).
A.M.C. van Dinther, C.G.P.H. Schroen, R.M. Boom, "High-flux membrane separation using fluid skimming dominated convective fluid flow", Journal of Membrane Science, vol. 371, pp. 20-27, 2011, DOI: 10.1016/j.memsci.2011.01.013.
Tequatic, "Fight Nasty High-Solids Water Tequatic Plus Filters", Amiad Water Systems, 2 pages, dated Nov. 2017.

* cited by examiner

FILTER SCREEN

CROSS-REFERENCE TO RELATED APPLICATIONS

This application is a 371 National Stage Entry of PCT Application No. PCT/US2019/041137, filed on Jul. 10, 2019, which claims priority to and benefit of U.S. Provisional Application No. 62/711,178, filed on Jul. 27, 2018.

BACKGROUND

It is often desirable to purify water that contains undesirable particles. One useful method of removing undesirable particles is cross flow filtration, in which water passes across the surface of a filter medium. Some of the water passes through the filter medium and is eventually collected as the permeate, which is accumulated as purified water. Large particles fail to pass through the filter medium and remain in the water that is passing over the surface of the filter medium. The water that does not pass into the filter medium continues across the surface of the filter medium, carrying the remaining large undesirable particles, and is eventually collected as the retentate.

In some types of cross flow filtration, the filter medium is a membrane having a regular array of parallel slots. Water flows across the surface of the membrane in a direction perpendicular to the long dimension of the slots. Water and particles that are much smaller than the smallest dimension of the slot pass through the slot. Particles that are much larger than the smallest dimension of the slot are rejected; that is, they remain in the retentate. Under some circumstances, because water and particles are flowing across the slots, some particles that are somewhat smaller than the slots are also rejected; that is, they fail to enter the slots and are retained in the retentate.

It is desirable that as many particles as possible remain in the retentate, so that the permeate is as pure as possible. In the past, it was contemplated to increase the rejection of small particles by increasing the velocity at which water flowed over surface of the membrane. This approach requires undesirably high energy consumption and creates undesirable wear on the membrane. In the past it was alternatively contemplated to manufacture membranes with smaller slots. Such membranes are difficult to manufacture and reduce the throughput of the filter.

It is desired to provide a membrane having size and arrangement of slots that improve the filtration process. It is desired to provide size and arrangement of slots that improve the ability of the membrane to reject particles having as small diameter as possible, preferably without the need of flowing the water over the surface of the membrane at high velocity and/or without the need for reducing the width of the slots. It is desired to provide filtration conditions that improve the ability of the membrane to reject particles as small diameter as possible.

SUMMARY

The following is a statement of the invention.

A first aspect of the present invention is a filter screen having a plurality of slots, each slot having a longest principal axis A1 that has a length L, and each slot having a second axis A2 that is perpendicular to A1 and that has a length W, wherein the slots are arranged so that all the axes A1 are parallel to each other;

the slots are disposed in a plurality of rows, wherein within each row the axes A2 are collinear; wherein the distance between center points of adjacent slots in the direction of the axes A2 is XP; wherein XP is greater than W;

the slots are disposed in a plurality of columns, wherein within each column the axes A1 are collinear; wherein the distance between nearest circumference points of adjacent slots in the direction of the axes A1 is YP;

wherein L is 800 micrometers or less; wherein XP is 350 micrometers or less.

A second aspect of the present invention is a method of purifying feed water, wherein the feed water comprises solid particles of diameter 5 μm to 100 μm, wherein the method comprises passing the feed water across the surface of the filter screen of the first aspect, wherein the feed water passes over the surface of the filter screen at a velocity Vt, wherein some of the feed water passes through the slots at velocity Vr, and wherein the quotient Vt/Vr is from 1 to 100.

A third aspect of the present invention is a filter screen having a plurality of slots, each slot having a longest principal axis A1 that has a length L, and each slot having a second axis A2 that is perpendicular to A1 and that has a length W, wherein the slots are arranged so that all the axes A1 are parallel to each other;

the slots are disposed in a plurality of rows, wherein within each row the axes A2 are collinear; wherein the distance between center points of adjacent slots in the direction of the axes A2 is XP; wherein XP is greater than W;

the slots are disposed in a plurality of columns, wherein within each column the axes A1 are collinear; wherein the distance between nearest circumference points of adjacent slots in the direction of the axes A1 is YP;

wherein L is 1600 micrometers or less; wherein XP is 180 micrometers or less.

A fourth aspect of the present is a method of purifying feed water, wherein the feed water comprises solid particles of diameter 5 μm to 100 μm, wherein the method comprises passing the feed water across the surface of the filter screen of the third aspect, wherein the feed water passes over the surface of the filter screen at a velocity Vt, wherein some of the feed water passes through the slots at velocity Vr, and wherein the quotient Vt/Vr is from 1 to 100.

BRIEF DESCRIPTION OF THE DRAWING

The following is a brief description of the drawings.

DETAILED DESCRIPTION

Figure 1:
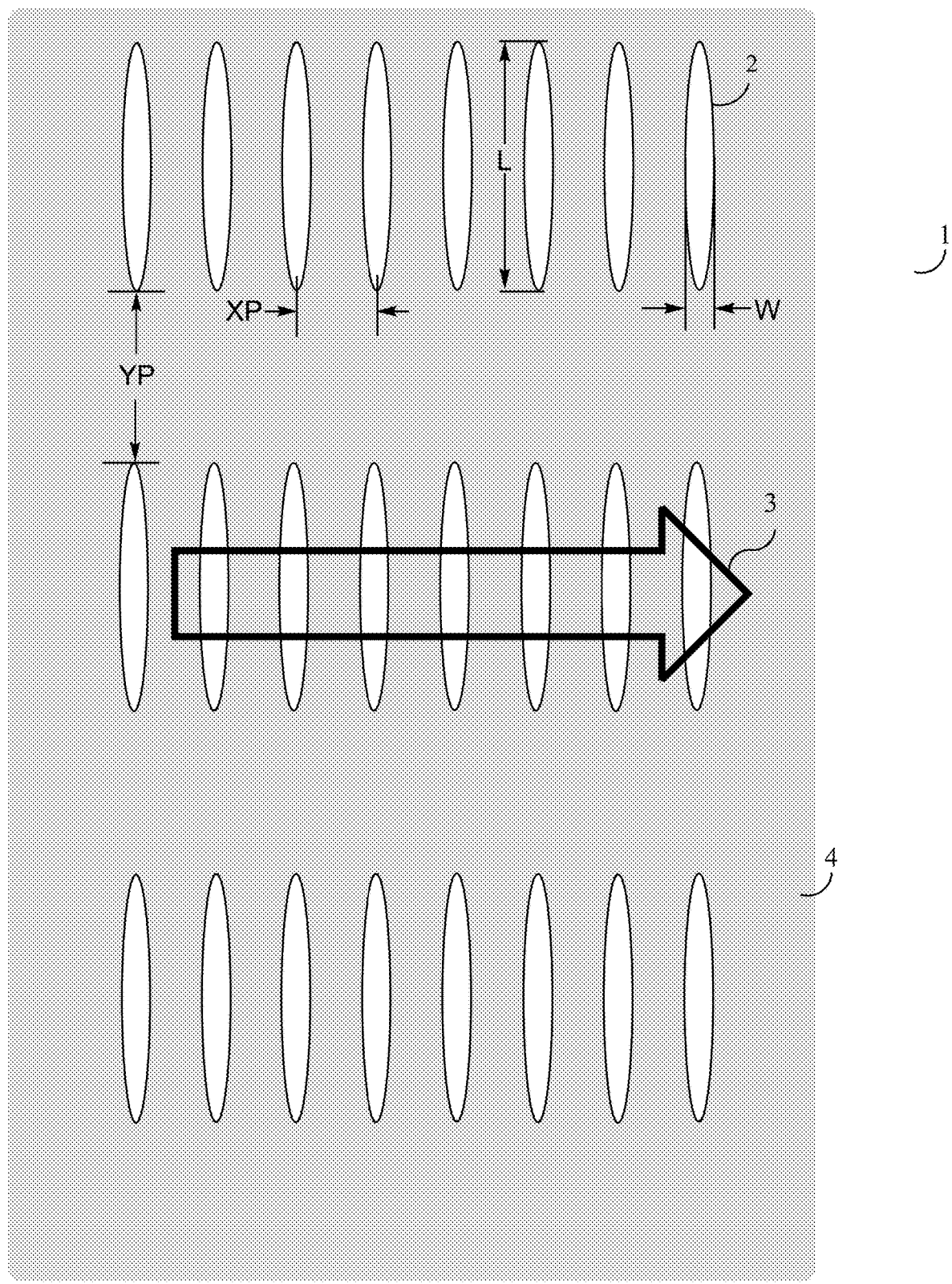
FIG. 1 is a top view of a filter screen that is an embodiment of the present invention.

The following is a detailed description of the invention. The present invention involves the use of a filter screen. Preferred filter screens are made of metal, preferably corrosion-resistant metal, more preferably corrosion-resistant steel, more preferably corrosion-resistant nickel steel. Preferably the thickness of the filter screen is 0.2 to 0.4 mm. The filter screen has a top surface, across which feed water will flow, and a bottom surface, away from which permeate will be removed. The solid portion of the filter screen is herein referred to as the "substrate."

The filter screen has a plurality of holes. Each hole is an opening that passes through the entire thickness of the filter screen. The shape of the opening of the hole at the top surface may be the same or different from the shape of the opening at the bottom surface. Preferably the opening of the hole at the bottom surface is larger than the opening of the hole at the top surface.

The holes may be produced by any method. A preferred method is laser percussion drilling.

It is useful to characterize the hole by the opening at the top surface, herein referred to as the "slot." It is useful to characterize the slot by determining the longest principal axis (A1), which is the longest line segment that passes through the center point and that has its end points on the circumference of the slot. The center point is determined as follows: an imaginary disk is envisioned that has a uniform cross section in the shape of the slot; an axis is determined that is perpendicular to the cross section and that passes through the center of mass of the disk. The location of that axis on the cross section is the center point. The length of axis A1 (i.e., the length between the end points that lie on the circumference of the slot) is L. A second axis (A2) is perpendicular to A1, passes through the center point, lies in the plane of the slot, has its endpoints on the circumference of the slot, and has length W. Preferably, the slot has a shape that is oval or ellipsoidal.

Preferably, W is 10 µm or larger; more preferably 25 µm or larger. Preferably, W is 60 µm or smaller; more preferably 50 µm or smaller; more preferably 40 µm or smaller.

Preferably, L is 100 µm or larger; more preferably 200 µm or larger; more preferably 300 µm or larger. Preferably, L is 1600 µm or smaller; more preferably 800 µm or smaller; more preferably 700 µm or smaller; more preferably 650 µm or smaller.

The slots are arranged in rows and columns. Within each row, the axes A2 of the slots are collinear. The distance between slots, herein labeled XP, is the distance from the center point of one slot to the center point of the nearest slot in the same row. Because the slots are distinct from each other, XP is larger than W. Preferably, XP is 50 µm or larger; more preferably 75 µm or larger; more preferably 100 µm or larger. Preferably, XP is 350 µm or smaller; more preferably 300 µm or smaller; more preferably 200 µm or smaller; more preferably, 150 µm or smaller.

Two preferred embodiments are envisioned, herein labeled "A" and "B." In A embodiments, L is 1600 µm or less, while XP is 180 µm or less. In A embodiments, L is preferably 1200 µm or less. In A embodiments, XP is preferably 150 µm or less. In B embodiments, L is 800 µm or less, and XP is 350 µm or less. In B embodiments, L is preferably 650 µm or less. In B embodiments, XP is preferably 200 µm or less. The A and B embodiments are identical to each other when L is 800 µm or less and XP is 180 µm or less.

Within each column, the axes A1 of the slots are collinear. Within each column, the separation between slots, herein labeled YP, is the shortest distance from any point on the circumference of a slot to any point on the circumference of the nearest slot in the same column.

Preferably, YP is 500 µm or longer; more preferably 700 µm or longer; more preferably 900 µm or longer. Preferably YP is 1400 µm or less; more preferably 1200 µm or less; more preferably 1000 µm or less.

Figure 2:
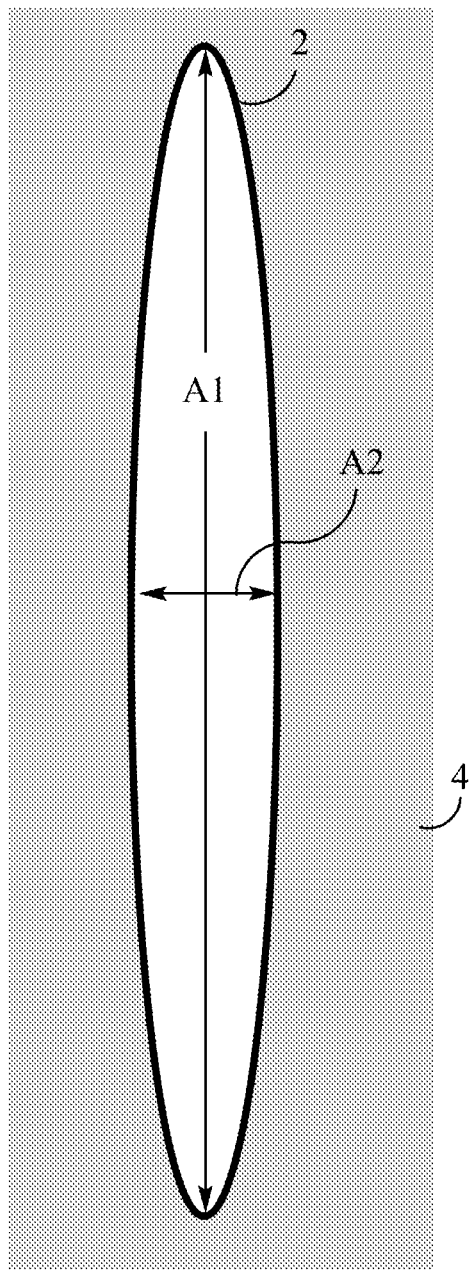
FIG. 2 is a top view of a single slot in the filter screen.

A filter screen of the present invention is illustrated in FIG. 1 and FIG. 2., which both show an overhead view of the top surface of a filter screen 1. The filter screen 1 has various slots 2 arranged in rows (horizontal in FIG. 1) and columns (vertical in FIG. 1). The slots 2 are the openings in the top surface of the substrate 4 of the filter screen 1. The definitions of axes A1 and A2 are illustrated in FIG. 2. The parameters W, L, XP, and YP are illustrated in FIG. 1.

Preferably, all the slots in the filter screen are effectively identical. It is contemplated that some variation in size of the slots will exist. Preferably, 90% or more of the slots will have L that has a quotient of L/Lav of from 0.8 to 1.2, where Lav is the average length of the slots in that screen. Preferably, 90% or more of the slots will have W that has a quotient of W/Wav of from 0.8 to 1.2, where Wav is the average width of the slots in that screen. Preferably, 90% or more of the XP values will have XP that has a quotient of XP/XPav of from 0.8 to 1.2, where XPav is the average of all the XP values in that screen. Preferably, 90% or more of the YP values will have YP that has a quotient of YP/YPav of from 0.8 to 1.2, where YPav is the average of all the YP values in that screen. Herein, when the slots of the filter screen are characterized as having W, L, XP, and YP, the values Wav, Lav, XPav, and YPav are meant.

The filter screen of the present invention is preferably used in a cross flow filtration method of removing undesirable particles from water. As used herein, "feed water" is water that contains undesirable particles. Feed water is intended to be filtered by the process of the present invention. "Particles" are solid at 25° C. A spherical particle has diameter Dp. A particle that is not spherical is said herein to have diameter (Dp) equal to the minimum Feret diameter (also known as the minimum caliper diameter) of the particle.

Preferred feed water contains undesired particles. Preferably the feed water contains particles having diameter of 100 µm or smaller; more preferably 60 µm or smaller; more preferably 40 µm or smaller; more preferably 25 µm or smaller; more preferably 15 µm or smaller. Preferably, the feed water contains particles of diameter 5 µm or larger. In addition to these preferred particles, the feed water may also contain some undesired particles that are larger than these preferred particles. These statements about the presence of particle diameters are not statements about average sizes. For example, a statement herein that the feed water contains particles of diameter 5 µm to 100 µm means that such particles are present in the feed water, regardless of whether additional particles are present or not.

Figure 4:
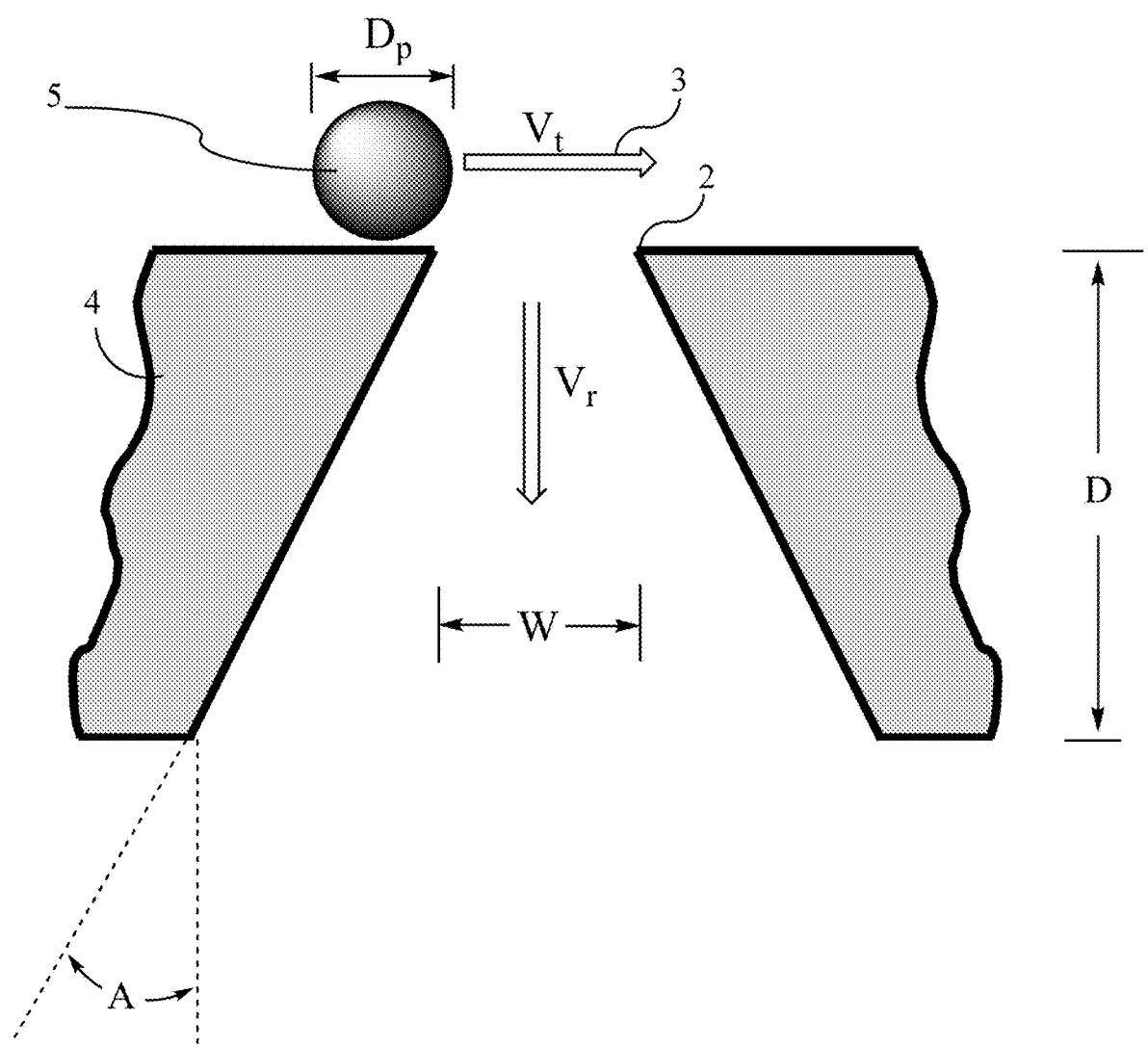
FIG. 4 is a side view of a single slot, showing a single particle.

Performing the cross flow filtration is illustrated in FIG. 1. The feed water is passed over the top surface of the filter screen. The direction of travel 3 of the water across the top surface of the filter screen is parallel to the axes A2. As illustrated in FIG. 4, a particle with Dp that is much smaller than W can readily pass through the slots, along with some of the water from the feed water. The water, possibly including some small particles, is collected and is labeled herein the "permeate." Particles that have Dp significantly larger than W will be retained in the feed water. After the feed water passes over the surface of the filter screen one or more times, the feed water, still containing relatively large particles, is then removed from contact with the filter screen, and the feed water is then referred to herein as "retentate."

Figure 3A:
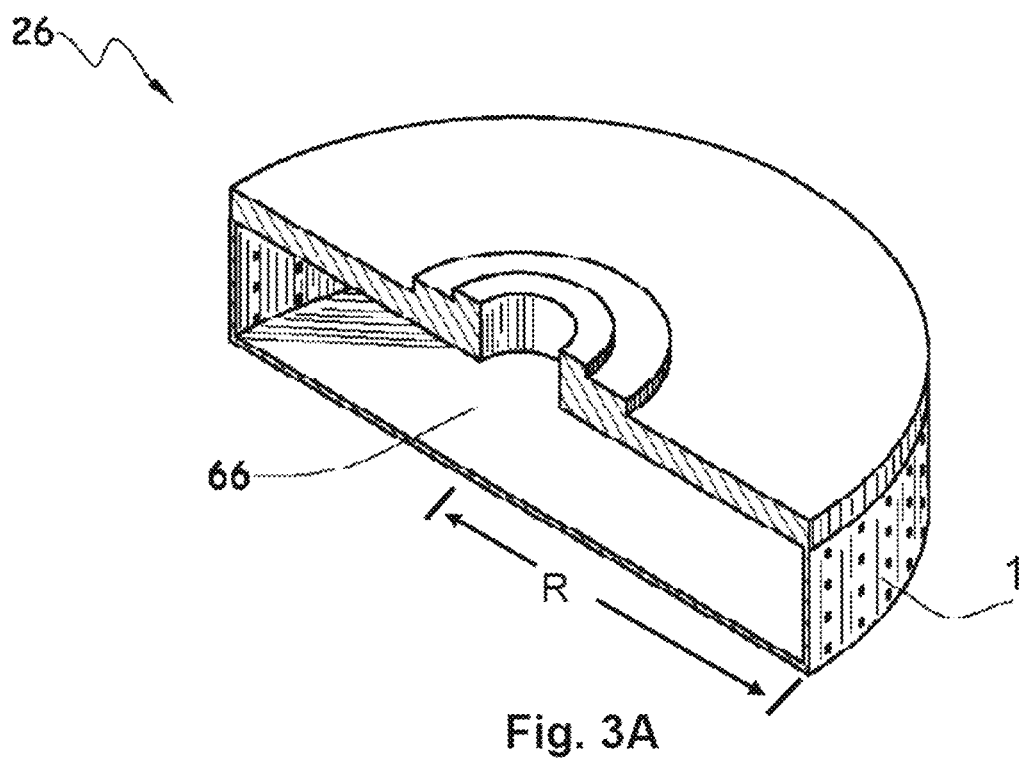
FIG. 3A is a perspective partially cut away view of a filter assembly.
Figure 3B:
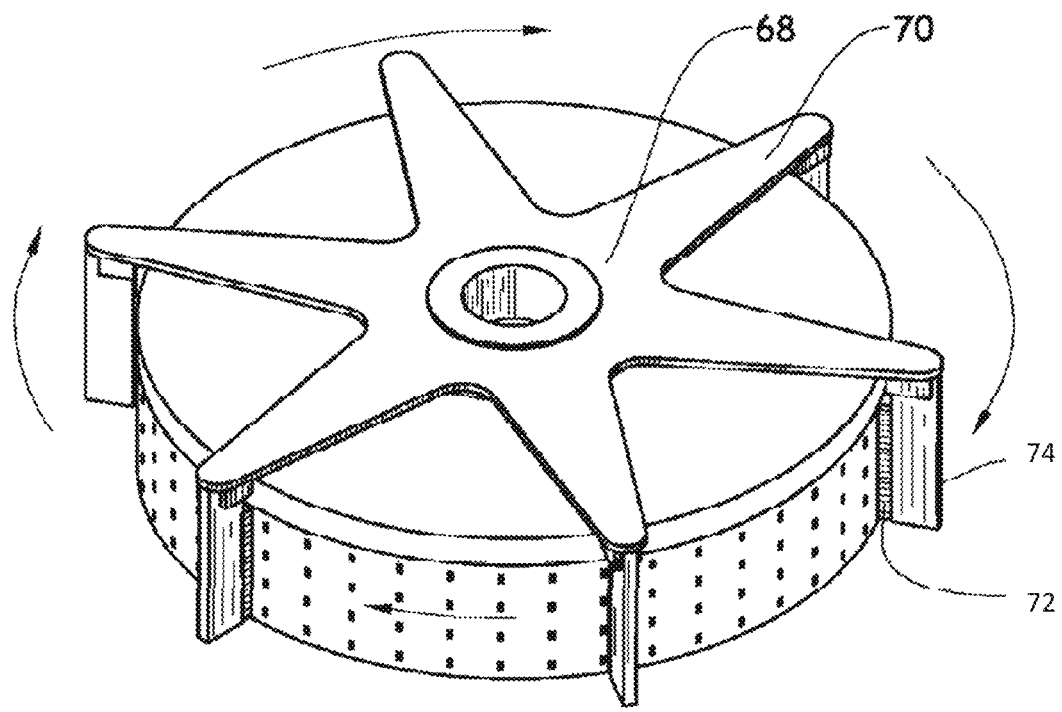
FIG. 3B is a perspective view of the filter assembly of FIG. 3A including a cleaning assembly.

One suitable apparatus for performing cross flow filtration is known as a hydroclone, and a suitable example is described in U.S. Pat. No. 8,663,472. The relevant portion of a hydroclone is shown in FIGS. 3A and 3B. The filter assembly 26 is located within a vortex chamber (not illustrated), and water circulates around the outside of the filter screen 1, as shown by the clockwise arrows in FIG. 3B. The hydroclone may include a cleaning assembly 68 for removing debris from the surface of the filter screen 1 of the filter assembly 26. A representative embodiment is illustrated in FIG. 3B wherein the cleaning assembly 68 is mounted on the top surface of the filter assembly 26 and includes one or more spokes 70 extending radially outward. A brush 72 extends downward from the end of the spoke 70 and engages (e.g. touches or comes very near to) the surface of the filter screen 1. While shown as a brush 72, alternative cleaning means may be included including wipers, squeegees or scrappers. From 2 to 50 brushes, and preferably from 18 to 24 brushes are used in most embodiments. As represented by curved arrows, the cleaning assembly 68 rotates about filter assembly 26 such that the brush 72 sweeps the surface of the filter screen 1 and removes debris, e.g. by creating turbulence near the surface or by directly contacting the surface. One or more paddles 74 may be mounted to the end of at least one spoke 70 such that fluid flowing into the vortex chamber rotates the cleaning assembly 68 about the filter assembly 26. Spacing paddles 74 evenly about the filter assembly adds stability to the rotating movement of the cleaning assembly 68 and may help maintain vortex fluid flow in the vortex chamber. While shown as extending radially outward from the surface of the filter screen 1, the paddles may be slanted, (e.g. from $-5°$ to $-30°$ or $5°$ to $30°$ from the radial axis) to increase rotational velocity.

While the present invention is not limited to any specific theory, it is considered that the present invention takes advantage of a phenomenon known as "particle skimming," which is described for example in two articles by Dinther et al. in the *Journal of Membrane Science* (vol. 371, pages 20-27, 2011; and vol. 440, pages 58-66, 2013). With reference to FIG. 4, it is considered that, without the phenomenon of particle skimming, particles having Dp less than W would pass through the slot into the permeate, while particles having Dp greater than W would be retained. However, under the correct conditions, such as, for example, those that can be present in a hydroclone, particles with Dp somewhat smaller than W will be retained.

The passage of a particle 5 past a slot 2 is illustrated in FIG. 4. Feed water, including a particle 5, is swept along the surface of the substrate 4 at velocity Vt. The velocity Vt is in the same direction 3 as the large arrow 3 in FIG. 1 that indicates the direction of flow. A particle 5 that passes through the slot 2 will travel in with velocity Vr along with the water that also passes through the slot 2.

When a brush 72 is used, the speed of the brush determines Vt. In such embodiments, $Vt=F*2*\pi*R$, where F is the rotational frequency of the cleaning assembly 68 (in cycles per second), and R is the radius of the filter assembly 26, from the rotation axis to the feed side of the filter screen 1, as shown in FIG. 3A.

The velocity Vr is determined by the rate at which permeate is removed from the apparatus. Typically, permeate is removed with a pump. The velocity $Vr=M/S$ where M is the permeate rate (cubic centimeters per second), and S is the total surface area of the slots. It is useful to characterize the operation of the apparatus by the velocity quotient $VQ=Vt/Vr$. Preferably VQ is 1 or higher; more preferably 2 or higher; more preferably 5 or higher; more preferably 10 or higher. Preferably VQ is 100 or lower; more preferably 75 or lower; more preferably 50 or lower; more preferably 30 or lower.

EXAMPLES

The following are examples of the present invention.

Example 1: Experimental Tests and Empirical Models Based on Data

Screens with different horizontal spacing XP and slot length L were made for testing. The slot width W and vertical spacing YP were kept constant at 40 μm and 500 μm respectively. The velocity quotient was kept constant at approximately 30.

The test set up consisted of a TEQUATIC™ PLUS filter (which is a cross flow filter) connected to a 100 gallon water tank which enabled preparing a controlled test water mixture. The test water was filtered using TEQUATIC™ PLUS filter and samples of test water, and filtered water were collected for particle size distribution (PSD) testing. PSD gives a breakdown of relative proportions of various sized particles that are present in a fluid suspension. PSD was determined using equipment called QICPIC that uses the principle of dynamic image analysis (DIA) to determine the PSD.

For each screen, at each particle diameter of undesirable particles, a "filter efficiency" is determined. The filter efficiency is the percentage of the particles of that diameter that remains in the retentate.

One important aspect of the filter efficiency results of a given experiment is the 80% cutoff, which is the particle diameter above which 80% or more of the particles are retained in the retentate. For particles of very small diameter, nearly all will pass through the slots, very few particles will remain in the retentate, and filter efficiency will be very low. For particles of very large diameter, nearly all will remain in the retentate, and filter efficiency will be near 100%. For some specific diameter, 80% of the particles will remain in the retentate, and the filter efficiency for that diameter is 80%. Smaller particles will have lower filter efficiency, while larger particles will have higher filter efficiency. The diameter at which 80% of the particles remain in the retentate is the "80% cutoff." A lower value of 80% cutoff is desirable, because a lower 80% cutoff means that more undesirable particles remain in the retentate, making the permeate closer to pure water.

The test water mixture for these experiments consisted of water and sand (specific gravity 2.65) consisting of particle sizes from 5 to 40 μm.

Filter screens with different slot length (range 400 to 1600 μm) and X-pitch (range 150 to 450 μm) were made and tested. The substrates were stainless steel with nickel chromium coating. The thickness of the filter screen was 0.2 mm. Slots were formed by laser percussion drilling, on a rectangular array as shown in FIG. 1. The slots had an oval shape. Filter efficiency curves and 80% cut offs were determined for each screen. Each screen was subjected to 4 to 6 replicate tests. The average 80% cutoff values for each screen were as follows:

TABLE 1

| Experimental Measurements | | | |
|---|---|---|---|
| Screen Number | L (μm) | XP (μm) | 80% cutoff (μm) |
| 1 | 1200 | 350 | 27 |
| 2 | 400 | 150 | 22 |
| 3 | 1600 | 450 | 26 |
| 4 | 800 | 450 | 29 |

An empirical model was then built by a linear least-squares fit to the above data. The empirical model was as follows:

(80% cutoff (μm))=7.5808+0.02848*(Slot length (μm))+0.05647*(X-Pitch (μm))+(−0.00007484)*(Slot length (μm))*(X-Pitch (μm))

The model led to various conclusions. For example, when the slot length was below 750 μm, lowering XP leads to improved filter efficiency (i.e., lower 80% cutoff). Some representative conclusions from this model for two screens, both having L=600 μm, and with XP=150 μm or 350 μm, are shown in Table 2.

TABLE 2

| Conclusions from Empirical Model L = 600 μm | | |
|---|---|---|
| | Filter Efficiency (%) | |
| Diameter (μm) | XP = 150 μm | XP = 350 μm |
| 5 | 8 | 4 |
| 15 | 35 | 20 |
| 24 | 80 | 68 |
| 28 | 87 | 80 |
| 35 | 95 | 92 |

At each particle size, the empirical-model screen with lower XP had higher filter efficiency than the screen with higher XP. The screen with lower XP had 80% cutoff of 24 μm, while the screen with higher XP had 80% cutoff of 28 μm.

This effect is more pronounced at smaller values of slot length. That is, for slot length values below 600, using a smaller slot length leads to a greater dependence of 80% cutoff value on XP, with lower XP values resulting in lower 80% cutoff values. It is noted that using a filter screen with low XP can result in low 80% cutoff values, without the need for a high VQ value and without the need for reducing W.

Example 2: Computational Modeling

A meso-scale Computational Fluid Dynamics (CFD) model was developed, which focused on a small number of slots in the screen, and the fluid region on both sides of the screen surface, utilizing periodic and symmetry boundary conditions. The particle motion was captured using a Discrete Element Model (DEM) method. The coupled transient, CFD-DEM, turbulent simulation was run using in the Star-CCM+software package, v11.02 (Siemens PLM Software).

The computational volume included a representative volume element (RVE) portion of the screen positioned near the vertical center of the geometric region. The injection points for the particles were near the slots. The model included four rows of ten slots each with periodic and symmetry boundaries to represent the remainder of the screen geometry. The centrifugal flow pattern will pass through the periodic faces, so that both the fluid and particles that exit the back set of periodic faces, will reappear on the front side with the same velocity vectors. The centrifugal forces due to the curvature of the screen is captured as a source term, Fc, in the momentum equation for the fluid and particles. The geometric parameters for the slots (see FIG. 1 and FIG. 4) include the screen/slot depth, D; the slot growth angle, A; the slot width, W; the slot length, L; and both the widthwise, XP, and lengthwise, YP, pitches (spacing). D, A, and W remained constant during this computational study. The values of D, A, and W were as follows:

D=216 μm
A=10 degrees
W=40 μm

As defined above, Vt=F*2*π*R, and Vr=M/S, and the velocity quotient is VQ=Vt/Vr.

The fluid properties (density and viscosity) were those of water. The particle properties were those of silicon dioxide (sand). The particles were assumed to be spherical sand particles with six distinct diameters: 10, 15, 20, 25, 30, and 40 μm; with an approximate initial particle size distribution of: 20, 20, 20, 20, 10, and 10% respectively. Stainless steel material properties are applied to the screen.

The computational model predicts filter efficiency as a function of time. The indicative prediction is at 0.04 seconds, which represents the time at a given slot from one stroke of a brush to the next. This prediction is used herein as the computational model's prediction of filter efficiency.

The computational model was able to make predictions about the effects of various parameters. For example, the following predictions were made for L=828 μm and YP=985 μm.

At VQ=10, the computational model predicts the following filter efficiency results (filter efficiency at 0.04 sec).
FE=filter efficiency
V-screen=virtual screen

TABLE 3

| Computational Predictions: Filter efficiency | | | | | |
|---|---|---|---|---|---|
| | | VQ = 10 | | VQ = 30 | |
| V-Screen # | XP (μm) | FE at Dp = 15 μm | FE at Dp = 20 μm | FE at Dp = 15 μm | FE at Dp = 20 μm |
| V1 | 185 | 62.1% | 99.5% | 71.2% | 97.6% |
| V2 | 135 | 68.8% | 99.8% | 82.4% | 99.3% |

The screen with XP=135 μm is predicted to perform better, especially for particles of Dp=15 μm. Also, the VQ of 30 gave better filter efficiencies at Dp=15 μm.

Another useful way of analyzing the predictions of the computational model is to observe that the model can predict filter efficiency (at 0.04 sec) as a function of particle diameter, and therefore the model can predict the 80% cutoff for each virtual screen. The 80% cutoffs for the two virtual screens described above were as follows:

TABLE 4

| Computational Predictions: 80% Cutoffs | | | |
|---|---|---|---|
| V-Screen # | XP (μm) | VQ = 10 80% Cutoff | VQ = 30 80% Cutoff |
| V1 | 185 | 17.4 μm | 16.7 μm |
| V2 | 135 | 16.8 μm | 14.6 μm |

The lower XP value led to the more-desirable lower 80% Cutoff values. The higher VQ value led to the more-desirable lower 80% Cutoff values.

It is expected that the same trend would occur for screens with L of 800 µm or less. That is, it is expected that screens that fell within the boundaries of the present invention would also show lower 80% cutoff values when the XP was reduced.

The invention claimed is:

1. A filter screen having a plurality of slots, each slot having a longest principal axis A1 that has a length L, and each slot having a second axis A2 that is perpendicular to A1 and that has a length W, wherein the slots are arranged so that
   all the axes A1 are parallel to each other;
   the slots are disposed in a plurality of rows, wherein the distance between center points of adjacent slots in the direction of the axes A2 is XP; wherein XP is greater than W;
   the slots are disposed in a plurality of columns, wherein the distance between nearest circumference points of adjacent slots in the direction of the axes A1 is YP;
   wherein L is 800 micrometers or less,
   wherein XP is 350 micrometers or less,
   wherein W is 50 micrometers or less, and
   wherein the filter has a curved surface.

2. The filter screen of claim 1, wherein the curved surface is enclosed by top and bottom surfaces.

3. The filter screen of claim 1, wherein XP is 200 µm or smaller.

4. The filter screen of claim 1, wherein within each row the axes A2 are collinear.

5. The filter screen of claim 4, wherein within each column the axes A1 are collinear.

6. The filter screen of claim 1, further comprising:
   one or more brushes engaged with the filter screen.

7. The filter screen of claim 1, wherein the slot has a shape along the Z axis that is substantially uniform.

8. The filter screen of claim 1, wherein 90% or more of the slots have W that has a quotient of W/Wav of from 0.8 to 1.2, and wherein Wav is the average width of the slots in that screen.

* * * * *